No. 647,512. Patented Apr. 17, 1900.
H. B. NICHOLS.
RAIL TRANSPORTING TRUCK OR WAGON.
(Application filed Jan. 20, 1900.)
(No Model.) 2 Sheets—Sheet 1.
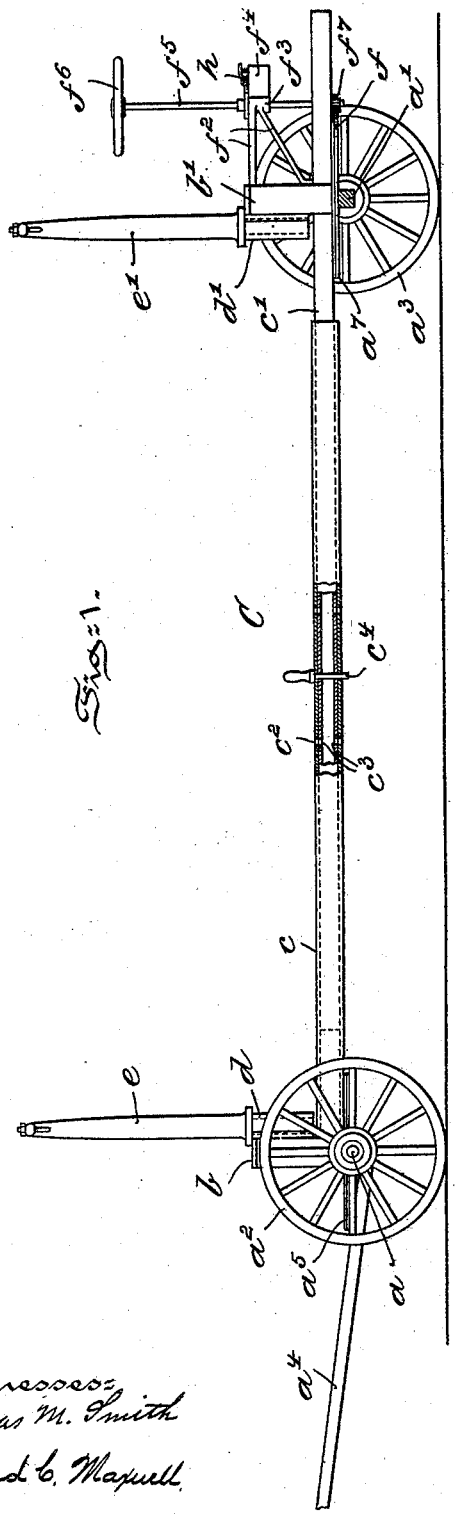
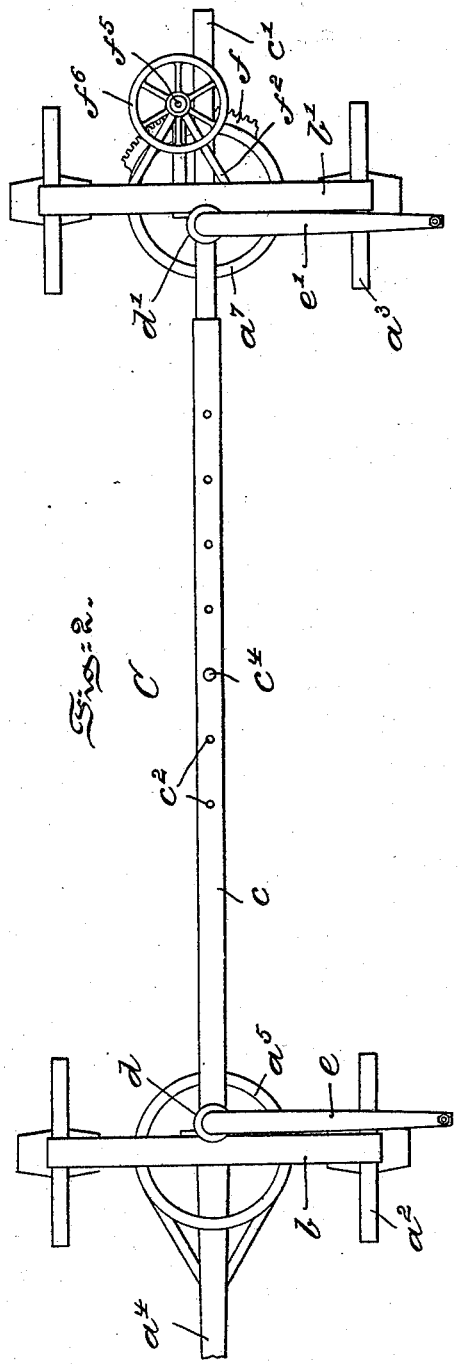

No. 647,512. Patented Apr. 17, 1900.
H. B. NICHOLS.
RAIL TRANSPORTING TRUCK OR WAGON.
(Application filed Jan. 20, 1900.)
(No Model.) 2 Sheets—Sheet 2.
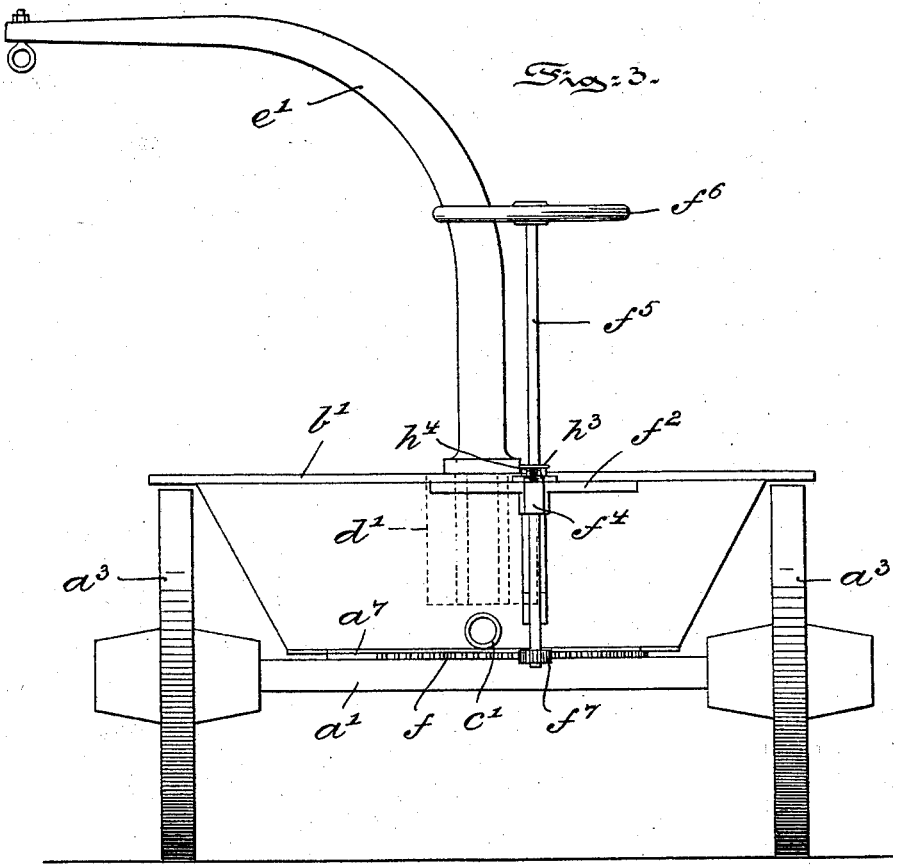
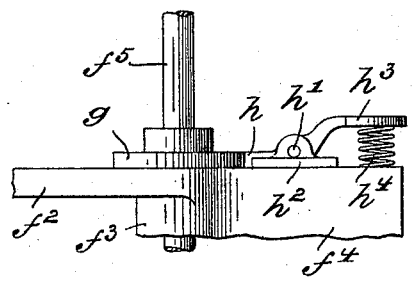
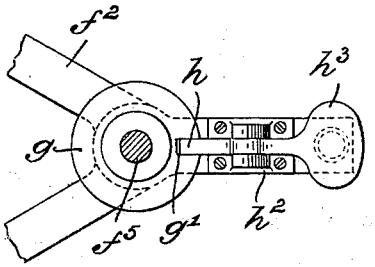

United States Patent Office.

HENRY B. NICHOLS, OF PHILADELPHIA, PENNSYLVANIA, ASSIGNOR OF ONE-HALF TO THE WILLIAM WHARTON, JR., & COMPANY, INCORPORATED, OF SAME PLACE.

RAIL-TRANSPORTING TRUCK OR WAGON.

SPECIFICATION forming part of Letters Patent No. 647,512, dated April 17, 1900.

Application filed January 20, 1900. Serial No. 2,116. (No model.)

*To all whom it may concern:*

Be it known that I, HENRY B. NICHOLS, a citizen of the United States, residing at the city of Philadelphia, in the county of Philadelphia and State of Pennsylvania, have invented certain new and useful Improvements in Rail-Transporting Trucks or Wagons, of which the following is a specification.

My invention has relation to a truck or wagon for elevating and transporting rails thereon, and in such connection it relates to the particular construction and arrangement of such a vehicle or conveyance for said purposes.

The principal objects of my invention are, first, to provide a truck or wagon for elevating onto and transporting rails from point to point thereby, of comparatively simple construction and arrangement, and in which the reach or perch connecting the front axle and its accessories with the rear axle and its accessories consists of metallic telescoping tubes arranged so that the length of the truck or wagon may be increased or decreased correspondingly with the length of the telescoping tubes constituting the extensible and adjustable reach or perch of the truck or wagon and the same provided with steering means controlled from one end of the truck, so that the course of the wagon may be directed and controlled in the travel thereof; second, to provide a truck or wagon of the character described with steering mechanism connected with the rear end and arranged so that the wagon or truck may be directed either in a straight or a curved course, and, third, to provide a truck or wagon of the character described with detachable davits connected with the wagon or truck to permit of the elevating of rails and delivery onto the wagon for the transporting of the same.

My invention, stated in general terms, consists of a rail-transporting truck or wagon when constructed and arranged in substantially the manner hereinafter described and claimed.

The nature and characteristic features of my invention will be more fully understood from the following description, taken in connection with the accompanying drawings, forming part hereof, in which—

Figure 1 is a side elevational view, partly in section, of a wagon or truck embodying main features of my invention, showing the tubular telescoping reach or perch, the detachable davits for elevating the rails, and the steering mechanism connected with the rear of the wagon or truck for controlling the course of the same in the travel thereof. Fig. 2 is a top or plan view of Fig. 1. Fig. 3 is a rear elevational view, enlarged, of Fig. 1. Fig. 4 is a side elevational view of a locking device adapted to be operated in conjunction with the steering mechanism of the wagon to control the travel of the wagon or truck in a straight course when required, and Fig. 5 is a top or plan view of the said device.

Referring to the drawings, $a$ and $a'$ represent the front and rear axles with their traveler-wheels $a^2$ and $a^3$.

$a^4$ is the pole of the wagon or truck.

$a^5$ is the front fifth-wheel.

$b$ and $b'$ are the front and rear bolsters, pivotally supported upon, respectively, the front and rear axles in any preferred manner and respectively extending over the wheels of the wagon and upon which rails are adapted to rest in the transporting of the same.

C represents the metal reach or perch, consisting of two tubes $c$ and $c'$, telescoping each other and respectively connected with the front and rear bolsters, so as to permit of the ready curving or turning of the truck or wagon. These tubes are provided at suitable distances apart with openings $c^2$ and $c^3$, through which bolts $c^4$ are adapted to be inserted for increasing or decreasing the length of the wagon to adapt the same to rails of different lengths.

$d$ and $d'$ are sockets suitably fastened to the respective bolsters $b$ and $b'$ and into which sockets are detachably inserted davits $e$ and $e'$, operating therein, so that the respective davits may be swung in such a direction as to permit of the raising of the rails, so as to be delivered onto the respective bolsters of the truck or wagon. The lower circular plate of the rear fifth-wheel $a^7$ of the wagon is provided with a rack $f$. Connected with the rear bolster is a bracket $f^2$, having a sleeve $f^3$ and a platform or plate $f^4$. Inserted through the sleeve $f^3$ is a rod $f^5$, carrying at its upper end a hand-wheel $f^6$ and at its lower end a pinion $f^7$, adapted to mesh with the rack $f$. To the rod $f^5$, above the plate or platform $f^4$, is secured a disk $g$, provided with a slit or notch $g'$.

$h$ is a bell-crank lever pivoted at $h'$ to a trunnion or bearing-plate $h^2$, secured to the platform or plate $f^4$, and the rear portion of said lever $h$ formed into a foot or seat $h^3$. Beneath the said foot or seat is located a spiral spring $h^4$, the respective ends of which bear against said plate $f^4$ and foot or seat $h^3$ to normally hold the tongue of said lever $h$ in engagement with the slit $g'$ of said disk $g$ to lock the said rack and pinion against movement to permit the wagon, when required, being directed so as to travel in a straight course, or the wagon may be directed so as to travel in a curved course by simply releasing the locking device, as described, from its engagement by the bell-crank lever $h$ with the slit or notch of the disk $g$, as will be understood from Figs. 4 and 5, to permit of the free turning of the hand-wheel $f^6$, and thereby to cause the pinion $f^7$ to actuate the rack $f$ in a circular path or course in the travel of the wagon.

Having thus described the nature and objects of my invention, what I claim as new, and desire to secure by Letters Patent, is—

1. In a rail-transporting truck or wagon, front and rear bolsters pivotally supported from the axles of the wagon, a reach or perch, consisting of two telescoping perforated tubes connected with said front and rear bolsters, the perforations of said tubes adapted to register with each other, and means adapted to be inserted into the perforations of said tubes to adjustably control the length of said wagon, substantially as and for the purposes described.

2. In a rail-transporting truck or wagon, front and rear bolsters pivotally supported from the axles of the wagon, and davits detachably and pivotally supported from said bolsters for elevating rails onto said bolsters, substantially as and for the purposes described.

3. In a rail-transporting truck or wagon, a fifth-wheel provided with a rack, a pinion operated by a rod provided with a hand-wheel and the rod carrying a disk provided with a slit, and a bell-crank locking device, the tongue of which is adapted to enter the slit of said disk so as to permit of the control of the course of the wagon, substantially as and for the purposes described.

In testimony whereof I have hereunto set my signature in the presence of two subscribing witnesses.

HENRY B. NICHOLS.

Witnesses:
RICHARD C. MAXWELL,
J. WALTER DOUGLASS.